United States Patent
Kjær et al.

(10) Patent No.: US 10,018,180 B2
(45) Date of Patent: Jul. 10, 2018

(54) WIND POWER PLANT WITH REDUCED LOSSES

(71) Applicant: Vestas Wind Systems A/S, Aarhus N. (DK)

(72) Inventors: Martin Ansbjerg Kjær, Harlev J (DK); Henrik Møller Ravn, Galten (DK); Jorge Martinez Garcia, Seville (ES); Henrik Møller, Egå (DK); Kouroush Nayebi, Ikast (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/314,558

(22) PCT Filed: May 19, 2015

(86) PCT No.: PCT/DK2015/050124
§ 371 (c)(1),
(2) Date: Nov. 29, 2016

(87) PCT Pub. No.: WO2015/180727
PCT Pub. Date: Dec. 3, 2015

(65) Prior Publication Data
US 2017/0234299 A1    Aug. 17, 2017

(30) Foreign Application Priority Data
May 30, 2014  (DK) .................................. 2014 70312

(51) Int. Cl.
*F03D 9/00*     (2016.01)
*H02P 9/04*     (2006.01)
(Continued)

(52) U.S. Cl.
CPC ........... *F03D 7/0284* (2013.01); *F03D 7/048* (2013.01); *F03D 9/257* (2017.02); *H02K 7/183* (2013.01); *H02P 9/00* (2013.01)

(58) Field of Classification Search
USPC ....................................................... 290/44, 55
See application file for complete search history.

(56) References Cited

U.S. PATENT DOCUMENTS

| | | | |
|---|---|---|---|
| 6,670,721 B2* | 12/2003 | Lof .......................... | H02J 3/381 290/2 |
| 6,906,431 B2* | 6/2005 | Wobben .................. | H02J 3/386 290/44 |

(Continued)

FOREIGN PATENT DOCUMENTS

| EP | 2072813 A2 | 6/2009 |
|---|---|---|
| EP | 2227856 A1 | 9/2010 |

(Continued)

OTHER PUBLICATIONS

European Patent Office, International Search Report and Written Opinion in PCT Application No. PCT/DK2015/050124, dated Jul. 24, 2015.

(Continued)

*Primary Examiner* — Pedro J Cuevas
(74) *Attorney, Agent, or Firm* — Wood Herron & Evans LLP (57) ABSTRACT

The present invention relates to a method for controlling a wind power plant, the wind power plant comprising a plurality of wind turbine generators, each wind turbine generator comprising at least one power converter for providing active power and/or reactive power to an electrical grid, wherein the method is determining a required amount of reactive power provided by the plurality of wind turbine generators, and grouping the plurality of wind turbine generators into a first set of wind turbine generators and a (Continued)

second set of wind turbine generators based on a demand for reactive power; and supplying reactive power to the grid (20) from the first set of wind turbine generators and disconnecting the second set of wind turbine generators from the electrical grid (20) in response to a control demand, in order to minimize active power losses. The present invention also relates to a wind power plant arranged to perform the method.

12 Claims, 4 Drawing Sheets

(51) Int. Cl.
*F03D 7/02* (2006.01)
*F03D 7/04* (2006.01)
*F03D 9/25* (2016.01)
*H02P 9/00* (2006.01)
*H02K 7/18* (2006.01)

(56) References Cited

U.S. PATENT DOCUMENTS

| | | | | |
|---|---|---|---|---|
| 7,099,800 B2* | 8/2006 | Henriksen | F03D 7/047 | 700/286 |
| 7,573,160 B2* | 8/2009 | Cardinal | F03D 7/028 | 307/153 |
| 7,808,126 B2* | 10/2010 | Stiesdal | H02J 3/1835 | 307/57 |
| 8,008,793 B2* | 8/2011 | Andresen | F03D 7/0272 | 290/44 |
| 8,108,079 B2* | 1/2012 | Wobben | F03D 7/0204 | 290/44 |
| 8,406,934 B2* | 3/2013 | Llorente Gonzalez | H02J 3/38 | 290/44 |
| 8,415,817 B2* | 4/2013 | Thisted | H02J 3/38 | 290/44 |
| 8,880,230 B2* | 11/2014 | Wobben | F03D 7/0204 | 290/44 |
| 8,933,572 B1* | 1/2015 | Abdur-Rahim | H02P 9/00 | 290/44 |
| 8,977,402 B2* | 3/2015 | Garcia | H02J 3/386 | 237/13 |
| 9,303,625 B2* | 4/2016 | Wobben | F03D 7/0204 | |
| 9,366,227 B2* | 6/2016 | Garcia | H02J 3/18 | |
| 9,407,186 B2* | 8/2016 | Babazadeh | H02P 9/02 | |
| 9,556,852 B2* | 1/2017 | Babazadeh | F03D 9/257 | |
| 9,853,306 B2* | 12/2017 | Hennessy | H01M 8/04186 | |
| 9,853,582 B2* | 12/2017 | Son | H02P 9/04 | |
| 9,897,074 B2* | 2/2018 | Hjort | F03D 7/028 | |
| 9,903,343 B2* | 2/2018 | Hjort | F03D 7/028 | |
| 9,932,966 B2* | 4/2018 | Gomis Bellmunt | F03D 7/048 | |
| 9,957,952 B2* | 5/2018 | Giertz | F03D 9/257 | |
| 9,973,125 B2* | 5/2018 | Brogan | H02P 21/50 | |
| 2003/0011348 A1* | 1/2003 | Lof | H02J 3/381 | 322/37 |
| 2005/0116476 A1* | 6/2005 | Feddersen | H02P 9/007 | 290/44 |
| 2005/0154499 A1* | 7/2005 | Aldridge | F02G 1/043 | 700/286 |
| 2008/0088131 A1* | 4/2008 | Thisted | H02J 3/38 | 290/44 |
| 2009/0096211 A1* | 4/2009 | Stiesdal | H02J 3/1835 | 290/44 |
| 2009/0218817 A1 | 9/2009 | Cardinal et al. | | |
| 2011/0140428 A1* | 6/2011 | Wakata | F03D 7/0284 | 290/44 |
| 2011/0148114 A1* | 6/2011 | Garcia | H02J 3/386 | 290/44 |
| 2013/0168963 A1* | 7/2013 | Garcia | H02J 3/18 | 290/44 |
| 2014/0375052 A1* | 12/2014 | Nielsen | F03D 7/00 | 290/44 |
| 2015/0042093 A1* | 2/2015 | Gomis Bellmunt | H02J 3/24 | 290/44 |
| 2015/0137520 A1* | 5/2015 | Garcia | H02J 3/1885 | 290/44 |
| 2015/0219074 A1* | 8/2015 | Babazadeh | F03D 7/048 | 290/44 |
| 2015/0249415 A1* | 9/2015 | Babazadeh | H02J 3/16 | 290/44 |
| 2015/0275862 A1* | 10/2015 | Babazadeh | F03D 9/257 | 290/44 |
| 2015/0365031 A1* | 12/2015 | Wessels | H02J 3/1885 | 290/44 |
| 2016/0108890 A1* | 4/2016 | Garcia | F03D 1/0666 | 700/287 |
| 2017/0025859 A1* | 1/2017 | Garcia | H02J 3/16 | |
| 2017/0244251 A1* | 8/2017 | Nielsen | H02J 3/1885 | |
| 2017/0335824 A1* | 11/2017 | Gupta | F03D 7/048 | |

FOREIGN PATENT DOCUMENTS

| | | |
|---|---|---|
| EP | 2693589 A1 | 2/2014 |
| WO | 2009083446 A2 | 7/2009 |

OTHER PUBLICATIONS

Danish Patent and Trademark Office, Search Report in PA 2014 70312, dated Dec. 2, 2014.

\* cited by examiner

WIND POWER PLANT WITH REDUCED LOSSES

FIELD OF THE INVENTION

The present invention relates to the technical field of wind power plants. In particular, the present invention relates to a control system for a wind power plant, in particular controlling the reactive power output of each wind turbine generator in the wind power plants.

BACKGROUND OF THE INVENTION

In some electrical grid-codes wind turbine generators are requested to supply reactive power even if they are curtailed to zero active power.

Wind turbine generators with power converter technology, and in particular, the full-scale type, those with the power converter connected in series between the stator of the electrical generator and the grid, have the capability to supply large amount of reactive power. This capability is highly desirable from a grid-stability point-of-view.

Wind turbines in a wind power plant are being coordinated through the SCADA or a power plant controller to act as a power plant. Here, the power plant controller can issue requests for both active and reactive power from the individual turbines in order to fulfill demands on plant level.

EP2693589 discloses a wind park control system for controlling reactive power output of wind turbines is described. The wind park delivers active power and reactive power to a utility grid. A total amount of reactive power required by the utility grid and an individual amount of reactive power for each wind turbine are determined. A capability scheme having an order for selecting the wind turbines to deliver reactive power is calculated based on the individual amount of reactive power and the total electrical power loss contributed by each connection of the wind turbines to the utility grid. An actual amount of reactive power provided by the wind turbines is adjusted. The reactive power output of each wind turbine is controlled based on the capability scheme. The wind turbines are selected for delivering reactive power in the order of the capability scheme so that the total amount of reactive power is fulfilled.

US2009218817 discloses a wind farm system is provided that is optimized for minimizing electrical loss. The wind farm system includes a plurality of wind turbine generators and a collector system including a conductor or network of conductors. The collector system also including a plurality of transformers with one or more transformers connected between each wind turbine generator and the conductors, and a substation transformer connecting the wind farm collector system to the electrical grid. The wind farm system also includes a monitoring system for monitoring the wind farm system electrical output and thermal condition, and outputs of the individual wind turbine generators. A control function may include voltage and real and reactive power commands to the individual wind turbine generators. The control function incorporates an algorithm whose technical effect is minimizing electrical losses for the wind farm system.

SUMMARY OF THE INVENTION

Although it is tried to minimize the losses of the entire wind power plant in prior art, a drawback of prior art is that the system only addresses the losses in the internal distribution grid of the wind power plant.

It is an objective of the present invention to minimize active power losses in a wind power plant including a plurality of wind turbine generators, while still providing the required reactive power support to the electrical grid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect, the present invention relates to a method for controlling a wind power plant, the wind power plant comprising a plurality of wind turbine generators, each wind turbine generator comprising at least one power converter for providing active power and/or reactive power to an electrical grid, the method comprising:
- determining a required amount of reactive power provided by the plurality of wind turbine generators;
- grouping the plurality of wind turbine generators into a first set of wind turbine generators and a second set of wind turbine generators based on a demand for reactive power;
- supplying reactive power to the grid from the first set of wind turbine generators and
- disconnecting the second set of wind turbine generators from the electrical grid in response to a control demand, in order to minimize active power losses.

An advantage of the first aspect is that by discharging the power converter, the wind turbine generator does not consume active power during zero-active-power production and therefore a reduced cost to operate the wind turbine generator in achieved.

A further advantage of the first aspect is that as the converter is utilized for less hours over a year, the life time is increased which means longer life time overall of the wind turbine generator. In addition as the converter is utilized for fewer hours over a year any service on the converter can be done with longer time-intervals.

In a second aspect, the present invention relates to a wind power plant system, the system comprising:
- a plurality of wind turbine generators, each wind turbine generator comprising at least one power converter arranged for providing active power and/or reactive power to an electrical grid;
- a control system for determining the required amount of reactive power provided by the plurality of wind turbine generators, wherein the control system is further arranged to group the plurality of wind turbine generators into a first set of wind turbine generators and a second set of wind turbine generators based on a demand for reactive power;
- wherein the first set of wind turbine generators is controlled, e.g. by the control system, to supply reactive power to the grid and the second set of wind turbine generators is disconnected from the electrical grid, in order to minimize active power losses.

In a third aspect, the present invention relates to a wind turbine generator, comprising at least one power converter for providing active power and/or reactive power to an electrical grid;
- the wind turbine generator comprising a controller arranged to receive a control command to disconnect or connect the wind turbine generator from the grid;

wherein said control command is set in response to a minimized electrical loss function for a plurality of wind turbine generators.

The advantages of the second and third aspect and its embodiments are equivalent to the advantages for the first aspect of the present invention.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

In some operational situation, a wind power plant is curtailed—that is, it is requested less active power than what is available in the wind. As turbines have a technical minimum production, the central controller might have to pause some turbines to get the plant-level power below the requested value if this is very low. As a paused turbine is disconnected from the grid the total farm-level capacity for reactive power is reduced. In some situations, (for instance, when all turbines are paused) the remaining capacity for reactive power becomes too low for what is required for grid compliance.

In many grid codes reactive power capability is included as requirements. However, the capability does not come for free; the power converters have a certain self-consumption of several hundreds of Watts.

Figure 4:
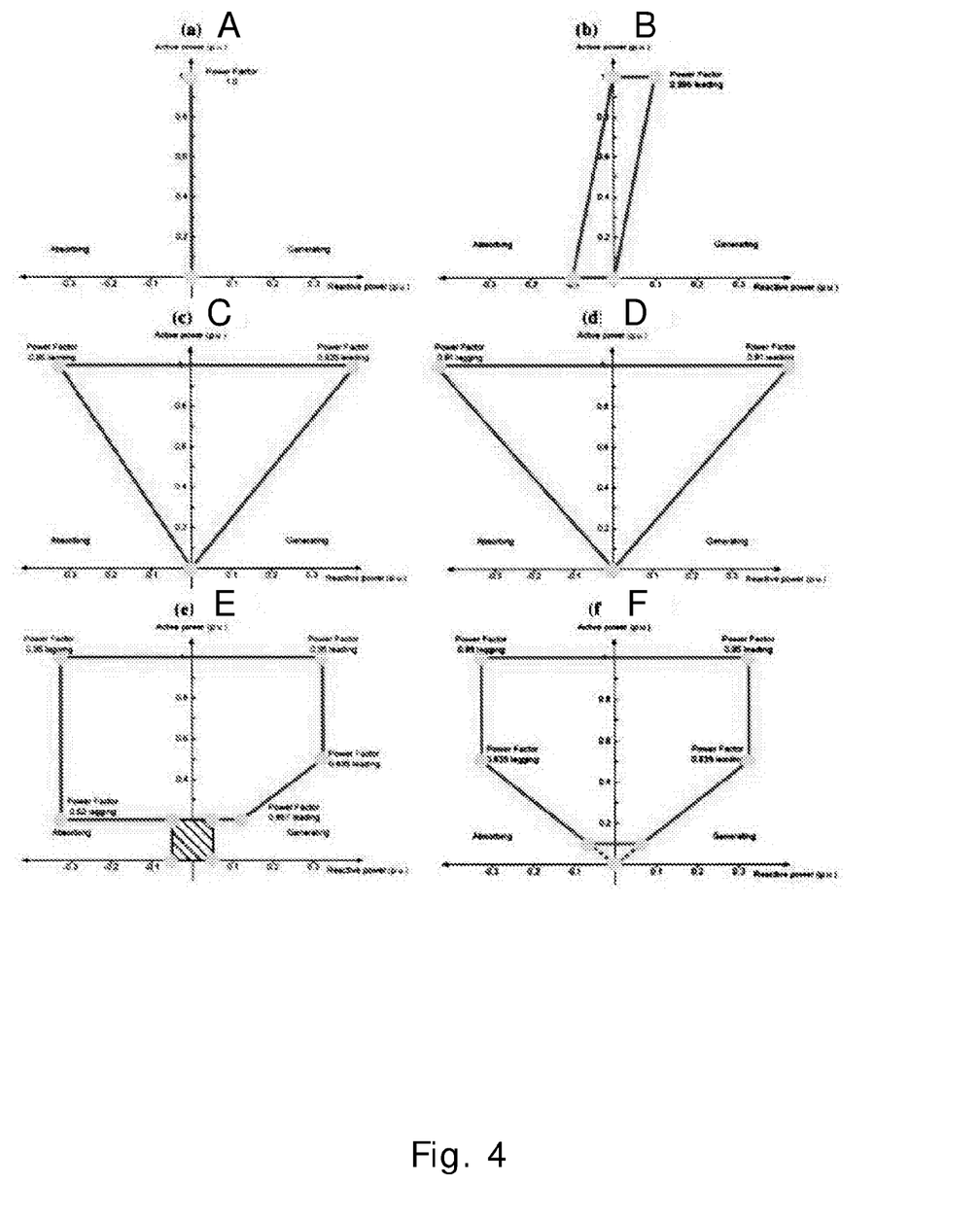
FIG. 4 shows examples of different grid code requirements for active and reactive power.

FIG. 4 shows how different grid codes have different requirements, when it comes to supply of reactive power as a function of active power.

As the upholding of reactive power capability causes an own-consumption of power from the grid to run the converter, a plant-level optimization method requesting reactive power capability of a limited number of wind turbine generators is therefore suggested.

When a wind turbine generator is disconnected from the grid it always take some period of time before it can be reconnected to the grid and be ready for providing either active or reactive power.

This black out period of time may be several seconds. So whenever disconnecting a wind turbine generator from the grid the operator runs the risk to encounter a situation where the urgent requirement for active or reactive power is higher than what the system can deliver at the specific time with the number of wind turbine generators 1 available.

The present invention comprises a system to make the wind turbine generators capable of providing reactive power, even when curtailed to zero active power. Furthermore, it proposes a method to minimize the own-consumption associated with upholding this capability by letting a centralized controller determine which wind turbine generator(s) to supply reactive power capability and thereby reducing the losses of the wind power plant.

A variable speed wind turbine generator 1, which is used in at least one of the described embodiments and which is capable for being connected to an electrical grid 20 is equipped with a control system. It comprises a rotor with a hub 3 and at least one blade 4 mounted to the rotor as discussed above. The rotor is connected, for example via a main shaft, to a generator for translating the torque of the rotor into electrical power. In some embodiments, a gearbox is interconnected between the rotor and the generator in order to translate the rotational speed of the rotor into a higher speed for the generator.

Figure 1:
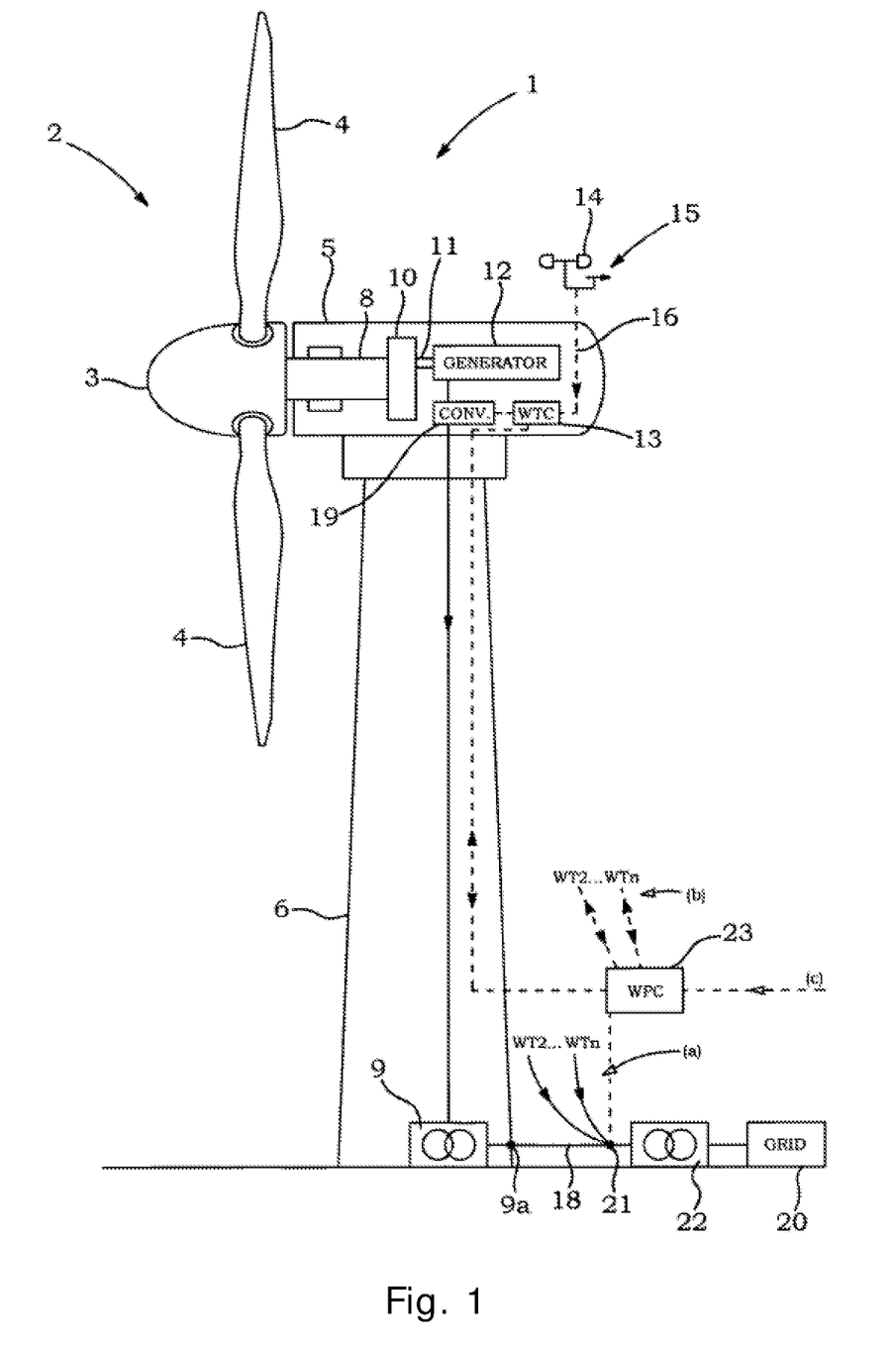
FIG. 1 shows a wind turbine generator according to the present invention.

FIG. 1 shows, an exemplary variable-speed wind turbine generator (WT) 1 is one of a plurality of wind turbine generators of a wind power plant (WPP). It has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high speed shaft 11. This structure is exemplary; other embodiments, for example, use a direct-drive generator.

The generator 12 (e.g. Induction or synchronous generator) produces electrical output power of a frequency related to the rotation speed of the rotor 3, which is converted to grid frequency (e.g. about 50 or 60 Hz) by a power converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant is fed into a wind power plant grid 18 (symbolized by "a" in FIG. 1). The wind power plant grid 18 is connected at a point of common coupling 21 and an optional further step up transformer 22 to a wind power plant external electrical utility grid 20.

A control system includes a wind-turbine controller 13 and a power plant controller 23. The power plant controller 23 controls operation of the individual wind turbine generator 1, e.g. selects the full-load or partial-load operation mode, depending on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the power plant controller, e.g. an instruction to provide a certain amount of reactive power in addition to the active power, etc. The wind-turbine controller 13 uses different input signals to perform its control tasks, for example signals representing current wind conditions (e.g. from an anemometer 14 and a wind vane 15 transmitted via line 16), feed-back signals representing pitch angle, rotor position, amplitudes and phases of the voltage and current at the generator 12 and the terminals 9a, etc., and command signals from the power plant controller 23.

The power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the power plant controller 23 monitors grid stability and, upon detection of a reduction of grid stability, commands the wind-turbine controllers 13 of the wind turbine generator 1 and the other wind turbine generators of the wind power plant 2 (at "b" in FIG. 1) to change operation by limiting fluctuations of the output power supplied. Upon receipt of such a command the wind-turbine controller 13, upon increase of the wind speed, cuts the high-output peak which would then be produced in normal partial-load operation with maximum efficiency, e.g., by adjusting the blade-pitch angle towards the flag position, to comply with the power plant controller's limit-fluctuation command.

Each wind turbine generator is connected to internal grid 18 through a circuit breaker (not shown in the figures) in order to disconnected the wind turbine generator from the grid. The circuit breaker may be located before or after the transformer 9.

Although the wind turbine generator 1 shown in FIG. 1 is expected to have three blades 4, it should be noted that a wind turbine generator may have different number of blades. It is common to find wind turbine generators having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 4 in the rotor 4.

Some embodiments pertain to a control system arranged to control at least one wind turbine generator 1 which may include some, or all, of the wind turbines of a whole wind park, in the manner describe above. The control system can be distributed, e.g. include controllers at the wind power plant and the wind turbine generator level or utility-grid level.

Figure 2:
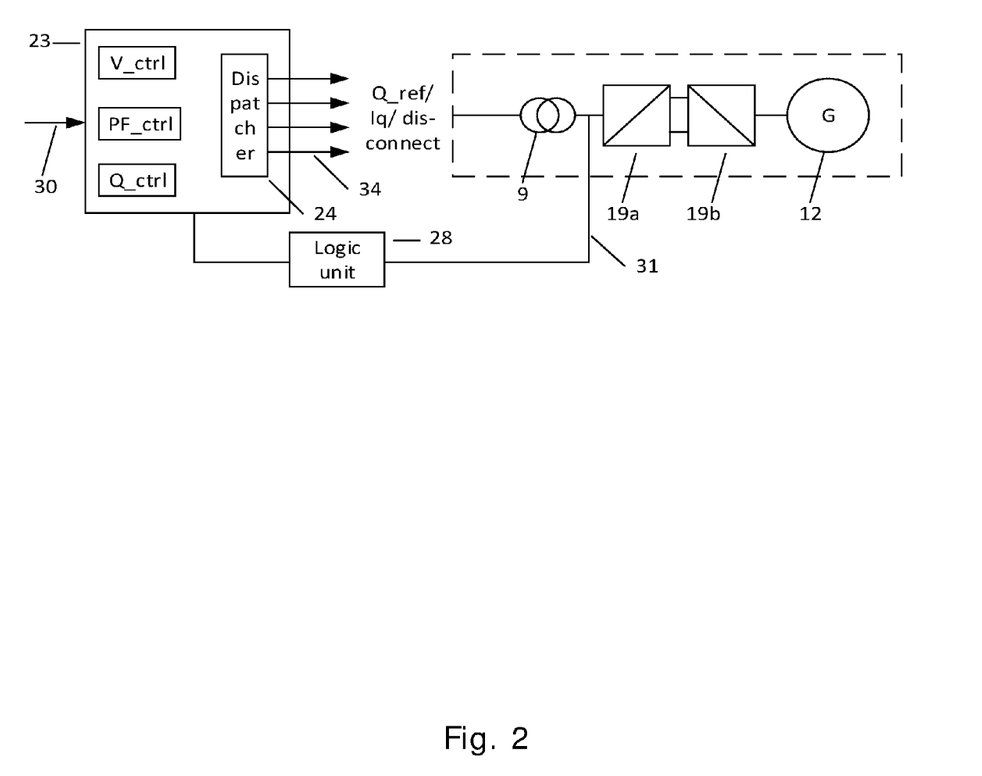
FIG. 2 shows a power plant controller connected to a wind power plant.

FIG. 2 shows a power plant controller 23 according to an embodiment of the invention. FIG. 2 shows only one wind turbine generator 1, which comprises similar elements as described in FIG. 1.

FIG. 2 shows a generator 12, connected to, and feeding power to a power rectifier 19b, that converts variable frequency AC power to DC power, an inverter 19a converts the DC power into fixed frequency AC power, the AC power is the transformed to a higher voltage level in a transformer 9, the higher voltage AC power is fed into the wind power plant grid 18. A signal vector 31 containing power production information about the individual wind turbine generator 1, is communicated to a logic unit 28 that receives similar signal vectors 31 from all the other wind turbine generators 1 in the wind power plant. The signal 31 may contain information about a the voltage level of the wind turbine generator, at either side of the transformer 9, often it is beneficial to measure the voltage level at the low voltage side of the transformer, and possibly translate the measurement to a value on the high voltage side of the transformer.

The logic unit 28 collects the signal 31 from the turbine 1 and sends it to the power plant controller 23. The logic unit may be integrated in the power plant controller 23.

The power plant controller 23 receives a set point 30 to follow from e.g. a grid system operator, and, depending on the specific plant, the different modes of control between which the power plant controller can choose. This may be voltage control, power factor control, and Q (reactive power) control.

The dispatcher 24 then dispatches a new set point 34 to each of the wind turbine generators 1 in the wind power plant. The dispatcher 24 regularly dispatches or communicates set points 34 to the wind turbine generators 1, whenever required.

The method and system of the present invention proposes to minimize the own-consumption associated with upholding the capability of providing reactive power from the power converters of the wind turbine generators 1 by letting the power plant controller 23 determine which turbine(s) to supply reactive power capability and thereby reducing the losses of the wind power plant.

The invention is divided into two parts;

1) Equipping the turbine with the control function of enabling/disabling the converter during zero-active-power on demand from the power plant controller 23 and 2) A method to select turbines to enable/disable the converter in order to minimize the own-consumption of the converter, i.e. active power losses.

Firstly, extending the wind turbine generator control 13 with an interface to the power plant controller 23 with a function to receive the standby control command and means to act upon the signal. This can in an embodiment be implemented as:

Allowing an external controller (SCADA/PPC) 23 to choose if reactive power should be available during "Full Active Power Curtailment". I.e., to choose if the power converter 19 should remain connected and charged when the turbine 1 is requested to deliver zero active power.

The function has two options:

Connect standby signal: Keeps the power converter 19 charged and connected to the grid even if the turbine is paused or in other ways requested to curtail its production of active power to zero or near zero. Near zero is to be understood as when the active power is substantially the same as the active power losses of the system. The same is done when the wind speed goes so low that the turbine cannot produce any active power and is awaiting better wind conditions.

Disconnect standby control command: Tells the power converter 19 not to be charged and stay disconnected to the grid when the turbine 1 is paused or in other ways requested to curtail its production of active power to zero or near zero. The same might be done when the wind speed goes so low that the turbine cannot produce any active power and is awaiting better wind conditions.

In an embodiment the same behavior could also be active for turbines 1 having stopped production due to low wind or even for turbines haven stopped due to high wind (above cut-out wind speed). This allows a power plant controller 23 to use them as sources of reactive power on the same line as turbines being paused deliberately by the power plant controller 23.

The turbines have two different ways to obtain "zero-active-power":

Pause (not offering reactive power capability)

Standby (offering reactive power capability)

When in either "pause" or "standby" mode, the turbine can switch from one to the other, resulting in connecting and disconnecting the converter.

Both of these modes will allow the external controller 23 to optimize the self-consumption of the entire farm of turbines during situations where the farm is curtailed to zero active power. For instance, the farm may be required to uphold 10% capacity for reactive power even if curtailed to zero active power. With the system according the prior art, the farm would be able to meet this requirement by keeping all turbine converter charged. This would give a high level of power consumption as each converter would consume power to keep the converter charged. The external controller 23 could for instance, according to the present invention, request 90% of the wind turbine generators to disconnect by dispatching the a control command which would reduce the own-consumption related to converter charging by 90%.

The wind turbine generator commands allow the external controller 23 to choose when to be able to deliver reactive power during active power curtailment—it even allows some flexibility to optimize the own-consumption.

Furthermore, the functions can be used during situations where the farm is curtailed to a value where one or more wind turbine generators 1 have to be paused, i.e. requesting technical minimum active power from all wind turbine generators 1 result in power above the curtailment level. The external controller 23 may choses the wind turbine generator or wind turbine generators to pause. The connect standby signals allow the external controller to either uphold a certain capability for reactive power supply or to reduce the self-consumption related to keeping the converter charged.

Assuming that the pause function, the standby function or both of the above described wind turbine generator modes are available for all wind turbine generators 1 of a wind power plant the invention proposes certain ways to choose which wind turbine generators to keep supplying reactive power capability during zero-active-power situations. The objective of the present invention is partly to minimize the self-consumption related to keeping converters charged while still meet the wind power plant level of reactive power capability demands.

It is important that the central controller can choose whether a wind turbine generator should supply reactive capability or not.

When the centralized controller 23 has chosen to request zero-active-power from one or more wind turbine generators 1, it will have to choose whether to keep the converter 19 charged or not. If some of the wind turbine generators are still producing active power, they will be able to supply reactive power to some level. If the running wind turbine generators (incl. STATCOMS/other compensation equipment) can meet the requirements for reactive power capability, all Zero-Active-Power wind turbine generators should receive a disconnect/Pause to save the power consumption related to keeping the converter charged.

If the running wind turbine generators (incl. STATCOMS/other compensation equipment) cannot meet the required level of reactive power capability there will be a certain level of requested reactive-power capability (ZAPQreq), which will be requested from the zero-active-power wind turbine generator.

The central controller 23 have all information needed to calculate requested reactive power demands as the capability of all running wind turbine generators are known (incl. STATCOMS/other compensation equipment) via P-Q chart and the total demand are most likely given by the grid code (or specs derived from the grid code), such as shown in FIG. 4.

When the requested reactive power is greater than zero, the central controller needs to choose which wind turbine generator converters to keep charged.

An embodiment of the present invention uses a prioritized list of wind turbine generators when deciding which wind turbine generators to keep charged and which to keep discharged during active power curtailment.

In another embodiment the central controller 23 choses to activate the wind turbine generator which in the specific situation can supply the highest amount of reactive power at the point of common coupling.

The method of the invention may comprise:
1. Calculate how many wind turbine generators to keep charged according a demand algorithm: $m = (ZAPQreq + Qmargin)/Qcap$,
    where Qmargin is a user-defined margin, for instance, 300 kVAr, Qcap is the reactive power capability of each wind turbine generator, and m is the number of wind turbine generators to keep charged.
2. Maintain an off-line static priority-list of wind turbine generators (all in the wind power plant). The list could be one of
    a) Randomly ordered
    b) Sorted for minimum electrical losses from wind turbine generator to point of common coupling (PCC)
    c) Ordered according to user priorities
    d) Ordered according to the priority in which wind turbine generators are chosen to be enabled for active power production
3. Remove wind turbine generators producing active power
4. Wind turbine generators soon to be started are moved to highest priority
5. Send "Connected" or "Standby" to the "m" highest prioritized wind turbine generators and "Disconnect" or "Pause" to the rest.

Item 2 takes a list which is given by the configuration of the system. That is, it is not changed during operation but is defined off-line based on the specific needs of the operator or other preferences. This static list is then used for initialization of a dynamic list which is updated frequently during operation.

Item 4 is not mandatory but provides some advantages: When a wind turbine generator is started it automatically charges the converter and supplies reactive power capability. If this wind turbine generator was not already supplying reactive power capability, another wind turbine generator would have to be disconnected. By prioritizing "wind turbine generators to be started" unnecessary charging and discharging is avoided. Item 2.d) is included for the same reasons.

In an embodiment the demand algorithm is executed when needed according to a set of predefined event, for instance, but not limited to the following:
    When ZAPQreq changes due to changes in the required farm-level reactive power demand;
    When a wind turbine generator is stopped/started due to changed active power demand;
    When a wind turbine generator is taken out of production for service;
    When a wind turbine generator shuts down due to an internal alarm.

In an embodiment the required reactive power is to be calculated from a ramp-rate perspective. The more power converters being charged, the faster the wind power plant can ramp the total amount of reactive power.

In an embodiment the selection of which wind turbine generator to use in the first group for supplying reactive, is the wind turbine generator with lowest operational hours for issuing connect command and those wind turbine generators with highest operational hours for issuing disconnect command.

Today this it is very rarely that a plant is commanded to zero production. It is for seen that this might become more frequent in the future, in particular in relative less-damped grids with high wind penetration.

Figure 3:
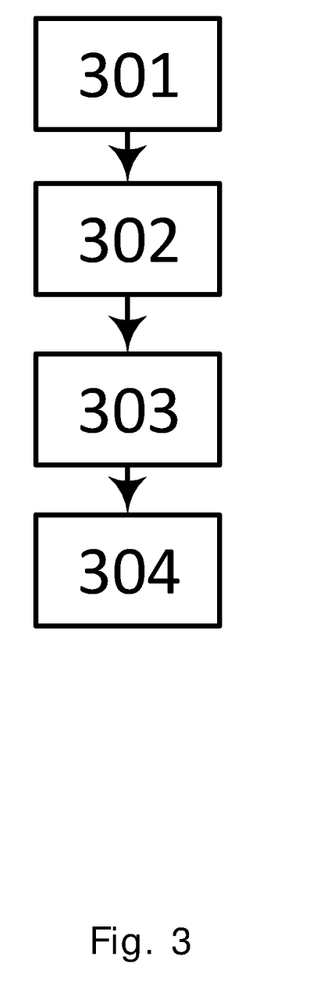
FIG. 3 shows a flow-chart of a method according to the invention.

FIG. 3 shows a flow-chart of a method according to the invention for controlling a wind power plant, the wind power plant comprises a plurality of wind turbine generators, each with at least one power converter for providing active power and/or reactive power to an electrical grid. Step 301 is determining the required amount of reactive power provided by the plurality of wind turbine generators, step 302 is grouping the plurality of wind turbine generators into a first set of wind turbine generators and a second set of wind turbine generators based on a demand for reactive power, and step 303 is supplying reactive power to the grid 20 from first set of wind turbine generators and step 304 is disconnecting the second set of wind turbine generators from the electrical grid 20, in order to minimize active power losses.

A motivation for using the present invention, is that estimates of the self-consumption of a multi MW power converter producing no active power and no reactive power are approximately 0.1%-0.2% of rated power. If the wind turbine generator produces reactive power the wind turbine generator will consume additional active power.

The losses in the power converter can be divided into a few main areas. The first is related to losses in the silicon chip (power switch), which can be divided into two groups, namely conduction losses and switching losses. Where the conduction losses are proportional to the conducted current in the silicon chips, and the switching losses are proportional to the switching frequency of the silicon chip. Other loss factors are copper losses in cables and chokes and losses in the DC link, although this is rather limited.

The power for the own-consumption at the wind turbine generator will have to be transported from the point of common coupling. The internal grid is therefore associated with even further losses and can be up for another optimization for loss reduction taking transmission losses and taking the location of the specific wind turbine generator into consideration.

Another motivation for using the present invention could be the service and life-time related to the converter. If the converter is left uncharged for a certain fraction of its use, its lifetime should be increased and/or the service intervals increased.

Two reasons for zero-active-power exist: "Low wind conditions", where the wind speed is below the "cut-in" speed and the wind turbine generator shuts down. Wind turbine generators normally do not produce any power when the wind speed is below 3 m/s, where the wind turbine generator of the prior art shuts down.

The second reason is "curtailment" where the plant is commanded to stop production or part of the production by the grid operator.

Operation of the circuit breakers or large power contactors cost in the sense that the breaker may ware out after a certain number of switch circles—also known as Connector Ware-out.

Taking the power converter of the wind turbine generator out of operation, will therefore introduce additional wareout of the connectors compared to the situations where all converters are kept on-line. However, the connectors or circuit breakers of the wind turbines of the prior art are often designed for a scenario where the converter is coupled out/disconnected in low wind or zero active power situation. Thus, the ware-out associated to the method according to the present invention is smaller than of the prior art.

In an embodiment, the wind turbine generator, or more specifically the power converter of the wind turbine generator, is disconnected from the electrical grid by opening an electrical contactor or circuit breaker.

This minimizes the losses of the system, but it also increases the time when the converter 19 can be ready to supply power to the grid again, as a new start up sequence of the converter is required, such as pre-charge of the DC link of the converter and synchronizing it to the grid.

In another embodiment, the wind turbine generator 1, or more specifically the power converter 19 of the wind turbine generator 1, is disconnected from the electrical grid by turning of the gate signals to the power electronic switches in the grid side of the power converter 19a.

The signal to the wind turbine generator to disable the gate signal, can simply be that the power plant controller dispatches a zero reactive power reference to the wind turbine generators, that are grouped in the second set of turbines, i.e. those which will not provide reactive power support at the present time.

Having the power converter disconnected from the grid only by disabling the grid signals to the converter 19a, will reduce the switching losses, but may still leave other sources of loss. A clear advantage of this embodiment is that the power converter can switch its mode into operation very fast compared to the time needed when the converter is disconnected by an open contactor.

In yet another embodiment the wind power system is operated with a combination of the two embodiments.

If the power converters are disconnected by means of disabled gate signals, it allows for a way of controlling the wind turbines where even fewer wind turbine generators have to be connected to the grid.

As the power plant controller 23 may dispatch a non-zero reactive power through the dispatcher 24 after the power plant controller has monitored at least one control variable of the electrical output of the wind power plant to the electrical grid, such control variable can be voltage, reactive power, reactive current or power factor or a control variable of the outputs of the individual wind turbine generators.

The individual wind turbine generator is capable of responding very fast the power plant controller 23 therefore can the grouping of the plurality of wind turbine generators into a first set of wind turbine generators and a second set of wind turbine generators be performed in response to the control variable and based on a demand for reactive power.

In summary the invention relates to a method for controlling a wind power plant, the wind power plant comprising a plurality of wind turbine generators, each wind turbine generator comprising at least one power converter for providing active power and/or reactive power to an electrical grid, wherein the method is determining a required amount of reactive power provided by the plurality of wind turbine generators, and grouping the plurality of wind turbine generators into a first set of wind turbine generators and a second set of wind turbine generators based on a demand for reactive power; and supplying reactive power to the grid (20) from the first set of wind turbine generators and disconnecting the second set of wind turbine generators from the electrical grid (20) in response to a control demand, in order to minimize active power losses. The present invention also relates to a wind power plant arranged to perform the method.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for controlling a wind power plant, the wind power plant comprising a plurality of wind turbine generators, each wind turbine generator comprising at least one power converter for providing active power and/or reactive power to an electrical grid, the method comprising:
   in response to a control command to the wind power plant to deliver reduced active power to the electrical grid, curtailing the production of active power from a selected plurality of wind turbine generators;
   determining a required amount of reactive power that still must be provided by the selected plurality of wind turbine generators that have curtailed active power production;
   grouping the selected plurality of wind turbine generators into a first set of wind turbine generators and a second set of wind turbine generators for providing the required amount of reactive power;
   supplying reactive power to the electrical grid from the first set of wind turbine generators; and
   disconnecting the second set of wind turbine generators from the electrical grid for not supplying reactive power to the grid, in order to minimize active power losses.

2. The method for controlling a wind power plant according to claim 1, the method further comprises;
   monitoring at least one control variable of the electrical output of the wind power plant to the electrical grid and outputs of the individual wind turbine generators; and
   grouping the plurality of wind turbine generators into a first set of wind turbine generators and a second set of wind turbine generators in response to the control variable for providing the required amount of reactive power.

3. The method for controlling a wind power plant according to claim 1, the method further comprises;
   deciding which wind turbine generators to group in the first set and which to group in the second set by using a prioritized list of the plurality of wind turbine generators.

4. The method for controlling a wind power plant according to claim 1, the method further comprises;
   comparing a number of operational hours of each of the wind turbine generator; and
   selecting the wind turbine generator with lowest number of operational hours to be placed in the first group for supplying reactive power.

5. The method for controlling a wind power plant according to claim 1, wherein the number of wind turbine generators of the first set of wind turbine generators is determined as the sum of a requested reactive-power capability and a user-defined margin divided by the reactive power capability of each wind turbine generator.

6. The method for controlling a wind power plant according to claim 1, the method further comprises:
   determining which wind turbine generators are capable of supplying the highest amount of reactive power at a point of common coupling;
   grouping wind turbine generators in the first set to include those wind turbine generators that are capable of supplying the highest amount of reactive power.

7. The method for controlling a wind power plant according to claim 1, wherein the number of wind turbine generators of the first set of wind turbine generators is determined to be calculated from a ramp-rate perspective.

8. The method for controlling a wind power plant according to claim 1, wherein at least the step of grouping the plurality of selected wind turbine generators into a first set of wind turbine generators and a second set of wind turbine generators is executed using at least predefined events.

9. A wind power plant system, the system comprising:
   a plurality of wind turbine generators, each wind turbine generator comprising at least one power converter arranged to provide active power and/or reactive power to an electrical grid;
   a control system for controlling the amount of power to be delivered from the power plant to the electrical grid, the control system being configured, in response to a control command for delivery of reduced active power, for curtailing the production of active power from a selected plurality of wind turbine generators, the control system further configured for determining a required amount of reactive power that still must be provided by the selected plurality of wind turbine generators that have curtailed active power production, wherein the control system is configured to group selected plurality of wind turbine generators into a first set of wind turbine generators and a second set of wind turbine generators for providing the requested amount of reactive power;
   the control system further configured for controlling the first set of wind turbine generators to supply reactive power to the electrical grid and for disconnecting the second set of wind turbine generators from the electrical grid for not supplying reactive power to the grid, in order to minimize active power losses.

10. The wind power plant system according to claim 9, wherein the wind power plant further comprises:
    a collector system including a network of conductors and/or transformers, wherein the wind turbine generators are connected to the at network of conductors;
    and wherein the control system is optimized to minimize the active losses of both the plurality of wind turbine generator and the collector system.

11. The wind turbine generator according to claim 9, wherein the power converter is arranged to disable a gate signal to at least one power switch of the power converter when receiving the control command.

12. At least one computer program product directly loadable into the internal memory of at least one digital computer, comprising software code portions for performing the steps of the method according to claim 1 when said at least one product is/are run on said at least one computer.

\* \* \* \* \*